United States Patent [19]

Inoue et al.

[11] Patent Number: 4,528,329

[45] Date of Patent: Jul. 9, 1985

[54] PRODUCTION OF POLYOLEFIN COPOLYMER

[75] Inventors: Hiroshi Inoue; Tadashi Sezume; Masaaki Isoi; Kunio Iwanami, all of Saitama; Kazuo Sei, Kanagawa, all of Japan

[73] Assignee: Toa Nenryo Kogyo Kabushiki Kaisha, Tokyo, Japan

[21] Appl. No.: 490,640

[22] Filed: May 2, 1983

[30] Foreign Application Priority Data

May 17, 1982 [JP] Japan .................................. 57-81472

[51] Int. Cl.$^3$ .............................................. C08L 51/00
[52] U.S. Cl. ........................................ 525/74; 525/78
[58] Field of Search ............................ 525/74, 65, 78

[56] References Cited

U.S. PATENT DOCUMENTS

| 3,222,420 | 12/1965 | Heppolette | 525/65 |
| 4,012,270 | 3/1977 | Fitko | 525/65 |
| 4,237,037 | 12/1980 | Takahashi | 525/74 |
| 4,440,911 | 4/1984 | Inoue et al. | 525/74 |

Primary Examiner—Allan M. Lieberman
Assistant Examiner—Robert E. L. Sellers, II
Attorney, Agent, or Firm—R. L. Graham

[57] ABSTRACT

A polyolefin product is produced by reacting a polyolefin grafted with a carboxylic acid or an anhydride thereof with a polar polymer containing epoxy groups. The unreacted epoxy groups in the resulting copolymer improves adhesion and compatibility with metals and other resins.

22 Claims, No Drawings

PRODUCTION OF POLYOLEFIN COPOLYMER

BACKGROUND OF THE INVENTION

The present invention relates to modified polyolefin copolymers and process for its production. The modified polyolefin is prepared by reacting a polyolefin grafted with an unsaturated carboxylic acid or an anhydride thereof with a polar polymer having epoxy groups.

Heretofore, the improvement of polyolefin in adhesion to metals, glass fiber, and polymers have been accomplished by grafting a polyolefin with a compound having polar groups, e.g., an unsaturated carboxylic acid such as maleic anhydride and acrylic acid, or by reacting further the resulting modified polyolefin with monomer or oligomer of amines, alcohols, or epoxy compounds.

However, modified polyolefins thus produced have disadvantages. Namely, the quantity of functional groups introduced into the modified polyolefin is too small to provide sufficient adhesion, particularly durable adhesion. In addition, such modified polyolefins are such that the part where grafting takes place is low in molecular weight (weight-average molecular weight hereinafter); therefore, they do not improve the compatibility of a polyolefin and a polar polymer when used as a compatibility improving agent.

SUMMARY OF THE INVENTION

It has been discovered that by reacting a high molecular weight polar polymer having effective number of epoxy groups with a modified polyolefin, a copolymer (or interpolymer) of improved properties in adhesion and compatibility with a polar polymer is obtained.

The improved copolymer is obtained by a process which comprises reacting a modified polyolefin prepared by reacting a polyolefin with an unsaturated carboxylic acid or an anhydride thereof, with a high molecular weight polar polymer having epoxy groups.

DESCRIPTION OF THE PREFERRED EMBODIMENTS

This modified polyolefin which is one of the raw materials for the polyolefin copolymer of this invention is prepared by grafting a polyolefin with an unsaturated carboxylic acid or anhydride thereof. The polyolefin for this purpose includes, for example, low-density polyethylene, linear low-density polyethylene (a copolymer of ethylene and an alpha-olefin), medium and high-density polyethylene, polypropylene, poly-1-butene, poly-4-methyl-1-pentene, ethylene-propylene copolymer, ethylene-1-butene copolymer, propylene-1-butene copolymer, ethylene-propylene copolymer rubber, ethylene-1-butene copolymer rubber, ethylene-propylene-diene terpolymer, and mixtures thereof. The unsaturated carboxylic acid or anhydride thereof which is used for graft reaction includes, for example, maleic acid, maleic anhydride, acrylic acid, methacrylic acid, citraconic acid, citraconic anhydride, itaconic acid, itaconic anhydride, and other -unsaturated carboxylic acid or anhydride thereof; and cis-4-cyclohexene-1,2-dicarboxylic acid, cis-4-cyclo-hexene-1,2-dicarboxylic anhydride, endobicyclo[2,2,1]-5-heptene-2,3-dicarboxylic acid, endo-bi-cyclo-2[2,2,1]-5-heptene-2,3-dicarboxylic anhydride, and other alicyclic dicarboxylic acid or anhydride thereof having a cis double bond in the ring.

The graft reaction of a polyolefin with an unsaturated carboxylic acid or anhydride thereof can be performed in a variety of known methods. In one method, for example, the graft reaction is accomplished by heating the two reactants to a high temperature in the presence or absence of a solvent for the reactants, with or without a reaction initiator. According to an industrial method, a polyolefin is mixed previously with an unsaturated carboxylic acid or anhydride thereof and a reaction initiator, and the resulting mixture is melted and mixed using an extruder at a temperature higher than the melting point of the polyolefin.

The modified polyolefin thus prepared should have a molecular weight from 5,000 to 1,000,000, preferably from 10,000 to 500,000, and have 1 to 50, preferably 1 to 10 on average, of the unsaturated carboxylic acid or anhydride thereof in the molecule and/or at the terminals of the molecule. If the molecular weight of the modified polyolefin is less than 5,000, the polyolefin copolymer to be obtained by the subsequent reaction is low in molecular weight and is poor in adhesion and performance when used as a compatibility improving agent for mixing of a polyolefin and polar polymer. On the other hand, if the molecular weight exceeds 1,000,000, the resulting copolymer is poor in moldability. If the number of the molecules of the unsaturated carboxylic acid or anhydride thereof grafted on to the polyolefin is less than one on average, the rate of reaction is low and much of the reactants remain unreacted. On the other hand, if it exceeds 50, the polymeric reaction takes place excessively, causing crosslinking and gelation. When using a polymer or copolymer of ethylene, the molecular weight of the modified polymer will be between 10,000 and 100,000. When using a polymer or copolymer of propylene, the molecular weight of the modified polymer preferably is between 80,000 and 200,000.

The polar polymer containing epoxy groups which is one of the raw materials for the polyolefin copolymer of this invention includes, for example, polymers or copolymers prepared by vinyl polymerization of vinyl compounds such as vinyl halide, vinyl ester, vinyl ether, vinyl ketone, acrylic acid and its derivative, and styrene and its derivative. Such polymers and copolymers have epoxy groups in the molecule and/or at the terminals of the molecule. Included also in them are epoxy resins having active epoxy groups at the terminals of the molecules.

Examples of such polymers and copolymers are the copolymer of (1) a monomer containing an epoxy group such as glycidyl ester, e.g., (meth)acrylic acid glycidyl ester, and glycidyl ether, e.g., (meth)acrylic acid glycidyl ether, and (2) at least one kind of monomer selected from aromatic compounds such as styrene, methylstyrene, α-methylstyrene, and vinyl styrene; acrylic acid and derivatives thereof such as (meth)acrylic acid, methyl (meth)acrylate, ethyl (meth)acrylate, propyl (meth)acrylate, iso-butyl (meth)acrylate, n-butyl (meth)acrylate, hexyl methacrylate, 2-ethylhexyl acrylate, and (meth)acrylonitrile; vinyl halide such as vinyl chloride; and fatty acid vinyl ester such as vinyl acetate and vinyl propionate.

Preferable among the polar polymer containing epoxy groups are glycidyl methacrylate-methyl methacrylate-styrene-ethyl acrylate copolymer, glycidylmethacrylate-methyl methacrylate-ethyl acrylate copolymer, glycidyl methacrylate-ethyl methacrylate copolymer, and styrene-glycidyl methacrylate copolymer.

These polar polymers containing epoxy groups should have a molecular weight of 2,000 to 1,000,000, preferably 5,000 to 1,000,000, most preferably 10,000 to 500,000. The number of epoxy groups in the molecule and/or at the terminals of the molecule should be 1 to 100 on average, preferably 1 to 50 on average. When reacting the polar polymer with a modified polyethylene or polypropylene, the polar polymer preferably should have a molecular weight of 10,000 to 100,000.

If a polyolefin copolymer superior in adhesion is to be obtained, the polyolefin copolymer to be obtained by reacting the polymer having an effective number of epoxy groups having high reactivity and affinity should have unreacted epoxy groups. Preferred one should have a molecular weight of 2,000 to 1,000,000, preferably 5,000 to 500,000, most preferably 10,000 to 250,000, and have 5 to 100, preferably 10 to 50, epoxy groups in the molecule and/or at the terminals of the molecule.

If a polyolefin copolymer superior in compatibility with a polyolefin and polar polymer is to be obtained, it is necessary to react a polymer having a high molecular weight, say 2,000 to 1,000,000, preferably 5,000 to 1,000,000, most preferably 5,000 to 500,000, and it is necessary to use a polymer having 1 to 20, preferably 1 to 10 epoxy groups on average in the molecule and/or at the terminals of the molecule.

When the polar polymer having epoxy groups has a molecular weight less than 2000, the polar polymer connected to the resulting polyolefin copolymer is low in molecular weight, and therefore, the resulting polyolefin copolymer is poor in performance as a compatibility improving agent for a polyolefin and polar polymer. On the other hand, when the molecular weight is in excess of 1,000,000, the resulting polyolefin copolymer is poor in moldability. Moreover, if the average number of epoxy groups in the molecule is less than 1, the rate of reaction is low and unreacted products are formed more; and if it is in excess of 100, the polymeric reaction proceeds excessively, causing crosslinking and gelation.

Since it is difficult to prepare a copolymer of an olefin and polar monomer by the block copolymerization of polyolefin, the polyolefin copolymer of this invention is produced by reacting the above-mentioned modified polyolefin with a polar polymer having epoxy groups, through the ring-opening that takes place between the epoxy group and the acid or anhydride thereof grafted on to the modified polyolefin. In this way a polar polymer can be easily grafted on to or block polymerized with a polyolefin.

The modified polyolefin can be reacted with the polymer having epoxy groups in any way used for grafting reaction. For example, the reaction may be accomplished by melting and mixing the polymers in a powerful mixing apparatus, or by subjecting the polymers to polymeric reaction in a solution.

The melt-mixing reaction may be performed as follows: Previously mixed two components are fed to a single-screw or multi-screw extruder continuously and melted and mixed at 150° to 250° C., and pelletized. Or, the two components are fed to a Banbury mixer for mixing at 150° to 250° C. for 5 minutes to 1 hour, followed by cooling and crushing.

The reaction in solution may be performed as follows: The two components are dissolved in an organic solvent such as aromatic hydrocarbons (e.g., benzene, toluene, xylene, ethylbenzene, diethylbenzene, and cumene) and hydrogenated aromatic hydrocarbons (e.g., tetralin and decalin). Then, reaction is carried out at 90° to 200° C. for 0.1 to 50 hours.

The quantity of the epoxy group-containing polymer to be reacted with the modified polyolefin is properly established according to the molecular weight of the intended polyolefin copolymer, the molecular weight of the polar polymer to be reacted, and the number of epoxy groups. Usually, the epoxy group-containing polymer is used in an amount of 5 to 200 parts by weight for 100 parts by weight of the modified polyolefin.

The polyolefin copolymer obtained according to the process of this invention contains unreacted epoxy groups. Therefore, it is superior in adhesion to metals and a variety of resins such as vinyl chloride resin, acrylic resin, polyester resin, styrene resin, and ABS resin. In addition, it is highly compatible with a variety of resins such as mentioned above, because the part grafted on to the polyolefin is a polymer. Therefore, it is effective as a compatibility improving agent to be used when a polyolefin is mixed with a resin such as mentioned above. Moreover, the polyolefin copolymer of this invention is transparent unlike the conventional blended composition.

The invention is now described in detail with reference to the following examples, in which quantities are expressed as percent by weight or parts by weight unless otherwise stated. The test methods used in the examples are described below.

Test Methods (1) Melt flow index (MI): According to ASTM D-1238.

(2) Molecular weight: According to gel permeation chromatography (GPC).

(3) Peel strength: Using an Instron universal tensile tester, the bonded layer is peeled off from one end of a long square test piece at an angle of 90° and a rate of pulling of 1 cm/min (for steel laminate) or at an angle of 180° and a a rate of pulling of 10 cm/min (for resin laminate). The peel strength (kg/cm) is expressed by the loan for peeling divided by the width of the test piece.

(4) Salt water resistance: Test piece of steel plate laminate, with a 1-cm cut reaching the steel plate made in the resin layer, is dipped in 3% salt water at 60° C. for 10 days, and then subjected to 90° peel strength test.

(5) Dispersibility: A lump of the composition obtained by mixing is cut at a low temperature and the cut surface is treated with chloroform and metalized with gold. By examination under an electron scanning microscope, the particle size is measured.

o . . . for smaller than 1 micron
Δ . . . for 1 to 10 microns
x . . . for greater than 10 microns (6) Delamination on bending: The composition obtained by mixing is formed into a 70×150×3 mm sheet using a hot press, and this is wound around a brass rod, 7 mm in diameter, to see if whitening takes place. Whitening is regarded as an indication of delamination.

EXAMPLES 1 TO 7

Modified polyolefins and epoxy group-containing copolymers were prepared and they were made into polyolefin copolymers as follows. The resulting polyolefin copolymers were evaluated with respect to physical properties, adhesion properties, dispersibility, and delamination on bending. The results are shown in Tables 1 to 4.

Preparation of Modified Polyolefin (1) Polyethylene modified with maleic anhydride 10 kg of linear low-density polyethylene powder having a molecular weight of 36,000 and a density of 0.926 (referred to as LLDPE hereinafter) was preliminarily mixed with 40 g of maleic anhydride and 2 ml of reaction initiator. The mixture was then extruded through a 65 mm$\phi$ vented single-screw extruder (L/D=28) set at 225° C., to effect modification reaction at a resin temperature of 230° C. The modified LLDPE was found to have a molecular weight of 46,000 and to contain 0.39% of grafted maleic anhydride or two molecules of maleic anhydride on one molecule of LLDPE.

(2) Polypropylene modified with maleic anhydride 10 kg of propylene-ethylene random copolymer powder (referred to as PP hereinafter) having a molecular weight of 220,000 and containing 4.6% of ethylene was modified with 30 g of maleic anhydride and 15 ml of reaction initiator in the same way as for LLDPE. The modified PP was found to have a molecular weight of 110,000 and to contain 10.23% of grafted maleic anhydride or 2.5 molecules of maleic anhydride on one molecule of PP.

Preparation of Epoxy Group-Containing Copolymer (1) Epoxy group-containing acrylic copolymer (I)

This was prepared by mechanically crushing glycidyl-methacrylate-methyl methacrylate-styrene-ethyl acrylate copolymer (which is commercially available under a trade name of Blemer G Copolymer #30 from Nippon Oils and Fats Co., Ltd.). Table I shows the molecular weight and the number of epoxy groups per molecule.

(2) Epoxy group-containing acrylic copolymers (II), (III), and (IV)

In a 2-liter autoclave with the atmosphere replaced with nitrogen were placed methyl ethyl ketone, methyl methacrylate, ethyl acrylate, glycidyl methacrylate, and bnzoyl peroxide as much as necessary, and reaction was carried out at 80° C. for 5 hours. The reaction product was dropped into methanol so as to separate the epoxy group-containing acrylic copolymer, followed by separation and drying. Table I shows the molecular weight and the number of epoxy groups per molecule of the resulting copolymers.

(3) Epoxy group-containing styrene copolymer (I)

In a 2-liter autoclave with the atmosphere replaced with nitrogen were placed 500 g of styrene, 5 g of glycidyl methacrylate, and 2.5 g of azobisisobutyronitrile. Polymerization reaction was carried out at 80° C. for 2.5 hours. The reaction product was dropped into methanol so as to separate the epoxy group-containing styrene copolymer, followed by separation and drying. Table 1 shows the molecular weight and the number of epoxy groups per molecule of the resulting copolymer.

Synthesis of Polyolefin Copolymer (1) In a Henschel mixer were preliminarily mixed maleic anhydride-modified LLDPE, styrene copolymer (II), and epoxy group-containing acrylic copolymers (I) and (IV) in the ratio shown in Table I. The mixture was fed to a vented single-screw extruder (40 mm$\phi$, L/D=28) equipped with a Dulmage screw at a rate of 150 g/min. The extruder was run at 75 rpm and the cylinder temperature was kept at 220° C. to effect reation. The extrudate was pelletized and the pellets were dissolved in xylene. The xylene solution was dropped into acetone with stirring to separate unreacted substances. Table I shows the degree of conversion and the molecular weight of the resulting polyolefin copolymer (Examples 1, 6, and 7)

(2) In a Banbury mixer were mixed maleic anhydride-modified LLDPE and epoxy group-containing acrylic copolymer (II) in the ratio shown in Table I. Mixing and reaction were performed at 220° C. for 10 minutes. After cooling, the reaction product was crushed and dissolved in xylene. The xylene solution was dropped into acetone to separate unreacted substances. Table I shows the degree of conversion and the molecular weight of the resulting polyolefin copolymer. (Example 2)

(3) In a 500-ml three-neck flask equipped with a stirrer and reflux condenser were placed maleic anhydride-copolymer (III) and styrene copolymer (I), and solvent in the ratio shown in Table I. The reactants were heated until the resins were dissolved, and reaction was carried out with stirring under reflux. The reaction liquid was dropped into acetone to separate unreacted substances. Table I shows the degree of conversion and the molecular weight of the resulting polyolefin copolymers. (Examples 3 to 5)

Performance of Polyolefin Copolymers (1) Adhesion properties

Each polyolefin copolymer obtained in Example was used as an adhesive in the form of sheet to make the following laminates. The peel strength of each laminate was measured. The results are shown in Table 2.

TABLE 1

| | Example 1 | Example 2 | Example 3 | Example 4 | Example 5 | Example 6 | Example 7 |
|---|---|---|---|---|---|---|---|
| Modified polyolefin | Maleic anhydride-modified LLDPE | Maleic anhydride-modified LLDPE | Maleic anhydride-modified LLDPE | Maleic anhydride-modified LLDPE | Maleic anhydride-modified PP | Maleic anhydride-modified LLDPE | Maleic anhydride-modified LLDPE |
| Average number of grafted acid (per molecule) | 2 | 2 | 2 | 2 | 2.5 | 2 | 2 |
| Molecular weight | 46,000 | 46,000 | 46,000 | 46,000 | 110,000 | 46,000 | 46,000 |
| Quantity charged (parts) | 80 | 60 | 50 | 50 | 50 | 100 | 100 |
| Epoxy group-containing copolymer | Epoxy group-containing acrylic copolymer (I) | Epoxy group-containing acrylic copolymer (II) | Epoxy group-containing acrylic copolymer (III) | Epoxy group-containing styrene copolymer (I) | Epoxy group-containing acrylic copolymer (III) | Epoxy group-containing acrylic copolymer (IV) | Epoxy group-containing styrene copolymer (II) |
| Average number of epoxy groups (per molecule) | 20 | 6 | 4 | 4 | 4 | 4 | 5 |
| Molecular weight | 10,000 | 40,000 | 50,000 | 50,000 | 50,000 | 2,000 | 3,000 |
| Quantity charged (parts) | 20 | 40 | 50 | 50 | 50 | 10 | 10 |

TABLE 1-continued

|  | Example 1 | Example 2 | Example 3 | Example 4 | Example 5 | Example 6 | Example 7 |
|---|---|---|---|---|---|---|---|
| Method for reaction | Extruder | Banbury mixer | Solution | Solution | Solution | Extruder | Extruder |
| Solvent | — | — | Toluene | Toluene | Xylene | — | — |
| Reaction temperature (°C.) | 220 | 220 | Under reflux | Under reflux | Under reflux | 220 | 220 |
| Reaction time (minutes) | — | 10 | 240 | 240 | 240 | — | — |
| Degree of conversion (%) | 50 | 45 | 65 | 65 | 55 | 20 | 30 |
| Molecular weight | 54,000 | 60,000 | 75,000 | 70,000 | 115,000 | 47,000 | 49,000 |

[1] Polyethylene/steel plate laminate: The adhesive sheet, 0.4 mm thick, was fusion bonded to a 3-mm thick HDPE (high-density polyethylene) to make a two-layer sheet. This sheet was laminated at 190° C. to a steel plate measuring 3 mm thick, 100 mm long, and 100 mm wide, which had undergone shot blasting. Two parallel cuts, 1 cm apart, reaching the steel plate were made in the laminated layer, and the laminated layer was peeled off at the end of the cut in preparation for peeling test.

[2] Polyester resin laminate: Two sheets of 0.2-mm thick stretched polyester films (PET) (commercially available under a trade name of Lumilar from Toray Industries, Inc.) were bonded together with the 0.1 mm thick adhesive sheet, at 200° C., under 10 kg/cm$^2$G, for 2 minutes. Thus, there was obtained a three-layered sheet composed of PET/adhesive sheet/PET. The resulting laminate was cut to 2.5 cm width for measuring peel strength.

[3] Plasticized polyvinyl chloride resin laminate: Two sheets of 1-mm thick press-molded plasticized polyvinyl chloride films (PVC) (containing 20% of plasticizer) were bonded together with the 0.1 mm thick adhesive sheet, at 150° C., under 10 kg/cm$^2$G, for 2 minutes. Thus, there was obtained a three-layered sheet composed of PVC/adhesive sheet/PVC. The resulting laminate was cut to 2.5 cm width for measuring peel strength.

For the purpose of comparison, the same laminates as above were prepared using as the adhesive layer the maleic anhydride-modified LLDPE used in Example 1, and the peel strength of these laminates was measured. The results are also shown in Table 2.

(2) compatibility

[1] Dispersion into the delamination from plasticized polyvinyl chloride resin: Resin compositions were prepared by mixing 20 parts of the copolymer prepared in Examples 2, 3, and 6, 30 parts of plastizied polyvinyl chloride resin (containing 20% of plasticizer), and 70 parts of LLDPE (density=0.926 and molecular weight-—36,000) using a Brabender at 150° and 60 rpm for 5 minutes. These compositions were used for evaluation of dispersion properties.

Also, these compositions were formed into sheets measuring 70×150×3 mm, using a hot press. These sheets were used for evaluation of delamination on bending.

The results are shown in Table 3.

For the purpose of comparison, the same tests as above were conducted for the maleic anhydride-modified LLDPE used in Example 1. The results are also shown in Table 3.

[2] Dispersion into and delamination from polystyrene: Resin compositions were prepared in the same way as above by mixing 20 parts of the copolymer prepared in Examples 4, 5, and 7, 30 parts of polystyrene (PS) (available under a trade name of Topolex 500 from Mitsui Toatsu Chemicals, Inc.) and 70 parts of LLDPE (same as in [1]) or homopolypropylene (PP-2) (MI=5). These compositions were used for evaluation of dispersion properties and bending test. The results are shown in Table 4.

For the purpose of comparison, the same tests as above were conducted for the maleic anhydride-modified LLDPE used in Example I. The results are also shown in Table 4.

TABLE 2

| | Experiment No. | | | | | |
|---|---|---|---|---|---|---|
| | 1 | 2 | 3 | 4 | 5 | 6 |
| Adhesive | Copolymer in Example 1 | Copolymer in Example 2 | Copolymer in Example 3 | Copolymer in Example 5 | Copolymer in Example 6 | Maleic anhydride-modified LLDPE |
| Peel strength (kg/cm) | | | | | | |
| Steel plate laminate | 20.0 | 15.0 | 15.0 | 18.0 | 12.0 | 8.5 |
| Salt water resistance of steel plate laminate | 12.0 | 5.0 | 4.5 | 4.0 | 2.5 | 0.5 |
| PET laminate | 4.8 | 4.5 | 4.5 | 3.8 | 2.0 | No adhesion |
| PVC laminate | 3.5 | 3.5 | 3.7 | 3.6 | 1.5 | No adhesion |

TABLE 3

| | Experiment No. | | | |
|---|---|---|---|---|
| | 7 | 8 | 9 | 10 |
| Copolymer in composition | Copolymer in Example 2 | Copolymer in Example 3 | Copolymer in Example 6 | Maleic anhydride-modified LLDPE |
| Dispersibility | O | O | Δ | X |
| Delamination on bending | No delamination | No delamination | Slight delamination | Delamination |

TABLE 4

| | Experiment No. | | | |
|---|---|---|---|---|
| | 11 | 12 | 13 | 14 |
| Composition | Copolymer in Example 4 | Copolymer in Example 5 | Copolymer in Example 7 | Maleic anhydride-modified LLDPE |
| | PS LLDPE | PS PP-2 | PS LLDPE | PS LLDPE |
| Dispersibility | O | O | Δ | X |
| Delamination on bending | No delamination | No delamination | Slight delamination | Delamination |

What is claimed is:

1. The reaction product which comprises:
   a modified polyolefin consisting essentially of a polyolefin having grafted thereon an unsaturated carboxylic acid or anhydride thereof; and
   from 5 to 200 parts by weight of a polar vinyl polymerized copolymer having epoxy groups and a molecular weight of between 5,000 and 1,000,000 per 100 parts of the modified polyolefin.

2. The reaction product of claim 1 wherein
   the modified polyolefin has a molecular weight of from 5,000 to 1,000,000 and from 1 to 50 unsaturated carboxylic acid groups or anhydride thereof in the molecule; and
   said polar copolymer has a molecular weight of 10,000 to 500,000 and from 1 to 100 epoxy groups, on average, in the molecule including terminals thereof.

3. The reaction product of claim 1 wherein
   the modified polyolefin has a molecular weight of from 5,000 to 500,000 and from 1 to 10 unsaturated carboxylic acid groups or anhydride thereof in the molecule including terminals thereof;
   said polar copolymer has a molecular weight of 10,000 to 500,000, and from 1 to 50 epoxy groups, on average, in the molecule including terminals thereof; and
   said product has a molecular weight from 10,000 to 1,000,000.

4. The reaction product of claim 3 wherein said modified polyolefin is a polymer or copolymer of ethylene having a molecular weight of 10,000 to 100,000, said polar copolymer has a molecular weight between 10,000 and 100,000, and the product thereof has a molecular weight of 10,000 to 250,000.

5. The reaction product of claim 2 wherein the polar copolymer is obtained by copolymerizing a monomer having a vinyl group with a monomer having an epoxy group.

6. The reaction product of claim 5 wherein the monomer containing epoxy groups include glycidyl-methacrylate.

7. The reaction product of claim 5 wherein the monomer containing a vinyl group is selected from acrylic monomers and styrene monomers.

8. The reaction product of claim 1 wherein the product contains unreacted epoxy groups.

9. The reaction product of claim 4 wherein the polyethylene is a copolymer of ethylene and an alpha-olefin and the modified polyethylene has a molecular weight of from 30,000 to 70,000.

10. The reaction product of claim 3 wherein the polyolefin is a homopolymer or copolymer of propylene and the modified polyolefin has a molecular weight of 80,000 to 200,000; said polar copolymer has a molecular weight of from 10,000 to 100,000, and said product thereof has a molecular weight of from 10,000 to 100,000, and said product thereof has a molecular weight 90,000 to 300,000.

11. A copolymer comprising:
    a modified polyolefin consisting essentially of a polyolefin having grafted on the molecules thereof an unsaturated carboxylic acid or anhydride thereof; and
    from 5 to 200 parts by weight per 100 parts by weight of said modified polyolefin of a polar vinyl polymerized copolymer having epoxy groups in the molecules thereof and a molecular weight between 5,000 and 1,000,000, a portion of, but not all of, said epoxy groups being reacted with the carboxylic acid or anhydride grafted to said polyolefin.

12. The copolymer of claim 11 wherein the polyolefin is a polymer or copolymer of $C_2$ or $C_3$.

13. A process for the production of a polyolefin having improved adhesion which comprises:
    grafting onto a polyolefin a material consisting essentially of unsaturated carboxylic acid or anhydride thereof forming a modified polyolefin; and
    reacting said modified polyolefin with from 5 to 200 parts by weight per 100 parts by weight of said modified polyolefin of a polar vinyl polymerized copolymer containing epoxy groups and having a molecular weight of between 5,000 and 1,000,000.

14. The process of claim 13 wherein the modified polyolefin and the polar copolymer are reacted such that the reaction product therefrom contain unreacted epoxy groups.

15. The process of claim 13 wherein
    the modified polyolefin has a molecular weight of from 5,000 to 1,000,000 and from 1 to 50 unsaturated carboxylic acid groups or anhydride thereof in the molecule; and
    said polar polymer or copolymer has a molecular weight of 10,000 to 500,000 and from 1 to 100 epoxy groups, on average, in the molecule.

16. The process of claim 13 wherein the modified polyolefin has a molecular weight of from 10,000 to 500,000 and from 1 to 10 unsaturated carboxylic acid groups or anhydride thereof in the molecule; and said polar copolymer has a molecular weight of 10,000 to 500,000, and from 1 to 50 epoxy groups, on average, in the molecule.

17. The process of claim 13 wherein the polar copolymer is obtained by copolymerizing a monomer having a vinyl group with a monomer having an epoxy group.

18. The process of claim 17 wherein the monomer including an epoxy group includes glycidyl-methacrylate.

19. The process of claim 17 wherein the monomer containing a vinyl group is selected from acrylic monomers, and styrene polymers.

20. The process of claim 13 wherein from 25 to 150 parts by weight of the polar polymer per 100 parts by weight of modified polyolefin are reacted.

21. The process of claim 13 wherein the polyolefin is a copolymer of $C_2$ or $C_3$.

22. The process of claim 21 wherein the polyolefin is a copolymer of ethylene and an alpha-olefin.

* * * * *